United States Patent [19]

Müller et al.

[11] Patent Number: 5,797,336

[45] Date of Patent: Aug. 25, 1998

[54] PROCESS FOR THE COMBUSTION OF WASTE MATERIAL WITH PRODUCTION OF THERMAL ENERGY

[75] Inventors: Patrick Müller, Schaffhausen; Hans Rüegg, Wohlen, both of Switzerland

[73] Assignee: Von Roll Umwelttechnik AG, Zürich, Switzerland

[21] Appl. No.: 702,550

[22] PCT Filed: Jan. 8, 1996

[86] PCT No.: PCT/CH96/00006

§ 371 Date: Oct. 24, 1996

§ 102(e) Date: Oct. 24, 1996

[87] PCT Pub. No.: WO96/21825

PCT Pub. Date: Jul. 18, 1996

[30] Foreign Application Priority Data

Jan. 10, 1995 [CH] Switzerland ............... 52/95

[51] Int. Cl.⁶ ....................................... F23J 11/00
[52] U.S. Cl. ................ 110/345; 110/210; 110/216; 110/245
[58] Field of Search ................. 110/245, 210, 110/211, 212, 214, 216, 345, 348; 165/104.16

[56] References Cited

U.S. PATENT DOCUMENTS 4,552,203  11/1985  Chrysostome et al. ........... 110/245 X
4,932,335   6/1990  Bruckner et al. ................ 110/245 X Primary Examiner—Henry A. Bennett
Assistant Examiner—Susanne C. Tinker
Attorney, Agent, or Firm—Oblon, Spivak, McClelland, Maier & Neustadt, P.C.

[57] ABSTRACT

Waste is burnt in a furnace chamber (1). The oxygen-containing flue gases resulting in this process are introduced into a fluidized bed in an afterburning chamber (5) and reburnt. Solids discharged with the flue gases from the afterburning chamber (5) are separated from the flue gases in a dust separator (9) and recycled to the afterburning chamber (5), so that a circulating fluidized bed is formed, which produces a very homogeneous temperature distribution in the afterburning chamber (5) and at the same time permits highly efficient cooling of the flue gases. A secondary oxygen feed for the afterburning is dispensed with, which enables a decrease in size both of the afterburning chamber (5) and also of the downstream heat-recovery and gas cleaning devices and improvement in efficiency resulting therefrom.

19 Claims, 3 Drawing Sheets

PROCESS FOR THE COMBUSTION OF WASTE MATERIAL WITH PRODUCTION OF THERMAL ENERGY

The invention relates to a process for the combustion of waste material with production of thermal energy.

Processes and waste combustion plants of this type are known, in which the furnace, e.g. a grate-fired furnace, is operated with an amount of air stoichiometrically required for the complete combustion of the waste materials or even with excess air.

Because of uneven distributions in space of this primary air feed, operating the furnace with a relatively large oxygen excess is almost unavoidable. Only in this manner can a complete burn-up of the waste materials introduced into the furnace be ensured. Thus, e.g. the slag from a grate-fired furnace for waste materials should only contain 3% by weight of volatile substances (measured as loss on ignition at 550° C.).

Some of the substances also leave the furnace unburnt on the flue-gas side. These unburnt gases and solid particles are likewise formed owing to uneven distributions in space of the primary air feed and insufficient flue gas mixing in the furnace chamber and leave the furnace chamber in the form of streams. These substances must be reburnt in an afterburning chamber. It has been customary hitherto to introduce additional combustion air, so-called secondary air, into the afterburning chamber to reinforce the afterburning and, in particular, to improve the cross-mixing of the flue gases.

Because of poor cross-mixing, in order to ensure the degree of burn-up of the flue gases prescribed by law, a relatively long residence time of the flue gases in the afterburning chamber must be ensured and a relatively large amount of secondary air must be admixed. This results in a very large size of the afterburning chamber and an increased size of the downstream apparatuses, such as boilers for heat recovery and gas cleaning devices, since the total volumetric flow rate is increased by the addition of secondary air. This also decreases the boiler efficiency and thus the achievable electrical efficiency of the combustion plant, since an increased flue gas volume also means greater waste-gas heat losses. For the boiler, this likewise results in a very large size, since the heat transfer from the hot flue gas to the cooling surfaces is relatively poor, in particular in the radiant part of the boiler.

A difficult problem in the combustion of waste materials is, in addition, the corrosive flue gases, which lead to corrosion problems in the boiler section. These occur preferentially on the hottest heat-transfer surfaces, i.e. on the superheater heating surfaces. Two principal mechanisms are involved: one is the direct high-temperature corrosion of the heat-transfer surfaces by corrosive substances in the flue gas; the other is the deposit formation on the heat-transfer surfaces by flyash, from the furnace, which contains sticky, corrosive substances, with heavy corrosion under these deposits. These intense corrosion phenomena on hot heat-transfer surfaces restrict the steam temperatures attainable and thus, if the steam is used for power generation, the electrical efficiency of the combustion plant. In addition, they lead to periodic shutdowns of the plant and complex boiler overhauls at great expense to remove the deposits on the heat-transfer surfaces.

A further problem in the combustion of materials is the formation of nitrogen oxides. For environmental protection reasons, these cannot be freely released into the surroundings. A plurality of processes have already been disclosed, e.g. the SNCR process (selective non-catalytic reduction process), see U.S. Pat. No. 3,970,739, in which nitrogen oxides in the flue gases are reduced to nitrogen by spraying in an ammonia solution or other suitable reducing agent, in the presence of the oxygen which is present in any case. The ammonia is conventionally introduced for this purpose at a suitable point in the flue gas stream. The flue gas temperature at the point of introduction plays an important role. It must be between 700° C. and 1100° C. If the flue gas temperature is too low, a great excess of ammonia is required. The unreacted ammonia in the flue gas is termed slip and represents an environmental pollutant. At an excessively high temperature, some of the ammonia burns. In both cases, the amount of ammonia required is unnecessarily high. Along the flue gas pathway through afterburning chamber and boiler, the temperature of the flue gases continuously decreases. The ammonia is introduced at the point of optimum flue gas temperature. However, this poses the problem that the flue gas temperature profile depends on the operating state of the plant and on the waste material which is burnt. This means that the position of the optimum introduction point depends on the operating state of the furnace.

The object underlying the present invention is to propose a more efficient process of the type mentioned at the outset which permits a control of the temperature profile.

This object is achieved according to the invention by the features specified below.

Use in metallurgy, where relatively small amounts of combustible gases arise, of a circulating fluidized bed for afterburning and cleaning of process waste-gases containing combustible constituents is disclosed by DE-A 33 07 848. In addition to the process gas as fluidizing gas, in this process, an oxygen-containing combustion gas is additionally introduced separately into the fluidized bed. This process would be disadvantageous for waste combustion, since this would in turn increase the flue gas stream with all the adverse consequences.

WO-A-95/00804 teaches the provision of two serially connected afterburning stages downstream of combustion of solids in a combustion chamber. In this case, the first afterburning takes place in a fluidized-bed reactor in the form of a riser pipe with feed of a stoichiometric amount of secondary air. To improve the afterburning, or for complete combustion of the gases, the second afterburning is carried out in a cyclone downstream of the riser pipe.

WO-A-88/05144 discloses providing an additional auxiliary combustion downstream of an afterburning stage, which auxiliary combustion is carried out in a fluidized-bed reactor with injection of additional fuel, in order to set an optimum temperature for gas cleaning, in particular desulphurization. In this reactor there is no removal of heat, but only gas cleaning.

The advantages achieved by the invention are, in particular that the recirculated solids effect a highly homogeneous temperature distribution in the afterburning chamber. This provides optimum and uniform reaction conditions for the afterburning.

The invention is accompanied by other advantages.

Firstly, the avoidance of addition of secondary oxygen which is then possible on the one hand effects a decrease in size, on the other hand produces a lower waste-gas volumetric flow rate and thus an improved boiler efficiency, since the waste-gas heat loss is smaller.

Secondly, the circulating fluidized bed enables highly efficient cooling of the hot flue gases entering into the afterburning chamber by means of the fact that the flue gases are brought into contact with cooler solid particles in the fluidized bed and only these particles are then brought into contact with the heat-transfer surfaces. Because of the high efficiency of the heat exchange between particles and flue gases, the flue gases, after entry into the afterburning chamber, are instantaneously cooled to the mixed temperature prevailing in the afterburning chamber. High-surface area radiant heating surfaces in the afterburning chamber are therefore unnecessary. Since the gas-solids flow in the fluidized-bed reactor has a much better heat transfer than a gas flow, the size of the heat-transfer surfaces, and thus the size of the boiler, can be greatly decreased.

Thirdly, the design of the afterburning chamber as a circulating fluidized bed permits a solution of the corrosion problems.

On the one hand, the erosive action of the gas-solids flow prevents the formation of corrosive deposits on the heat-transfer surfaces in the fluidized bed. On the other hand, sticky fly dusts introduced into the after-burning chamber combine with the solids circulating in the afterburning chamber even before they come into contact with the heat-transfer surfaces. The conversion to higher steam temperatures is only made possible by a further feature of the invention: some of the heat-transfer surface is moved out of the flue gas pathway to an external fluidized-bed cooler. The solid particles serve as an intermediate medium for heat transfer from the afterburning chamber to the fluidized-bed cooler: some of the solids circulating in the afterburning chamber are passed into the fluidized-bed cooler. The cooled solids from the fluidized-bed cooler are recycled to the afterburning chamber, where they absorb heat from the flue gas stream. In the context of the invention, the heat-transfer surfaces most greatly affected by corrosion are arranged in the fluidized-bed cooler, that is to say outside the flue gas pathway. These are the hottest heat-transfer surfaces, that is to say the superheater surfaces. This achieves a further great reduction in the corrosion rate. The conversion to higher steam temperatures which is then possible considerably improves the electrical efficiency of the combustion plant. At the same time, these measures, because of the decreased tendency to encrustation and corrosion, decrease the extent of overhaul required and thus increase the availability of the plant.

Fourthly, the design of the afterburning chamber as a circulating fluidized bed permits a solution to the problem of selecting the point for ammonia introduction for flue gas denitration. The circulating fluidized bed, in addition to the temperature constancy, is also distinguished by good temperature control behaviour. Thus, e.g., the solids mass stream diverted into the fluidized-bed cooler can be controlled. This permits a control of the heat flow removed from the afterburning chamber and thus an exact control of the temperature in the afterburning chamber, independently of the operating state of the furnace. By this means, a fixed point for ammonia introduction can be selected, since the flue gas temperature profile in the afterburning chamber and boiler are no longer dependent on the operating state of the furnace. This additionally enables the ammonia consumption for decreasing nitrogen oxide to be minimized by selecting an optimum temperature in the afterburning chamber, independently of the operating state of the furnace.

The invention is now described in more detail with reference to the drawings.

Three variants of the process of the invention are depicted in the drawings and are described in more detail below.

Figure 1:
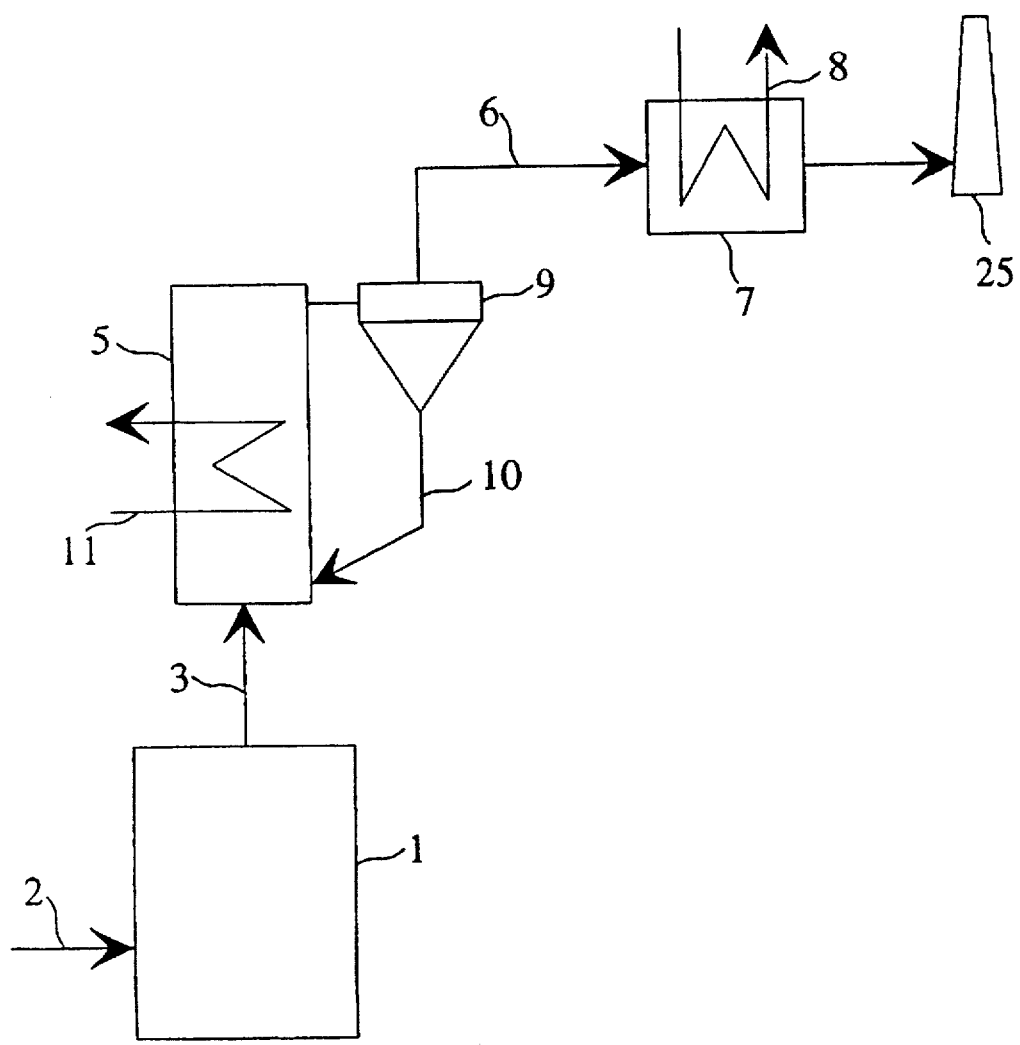
FIG. 1 shows a flow diagram of a first process variant.
Figure 2:
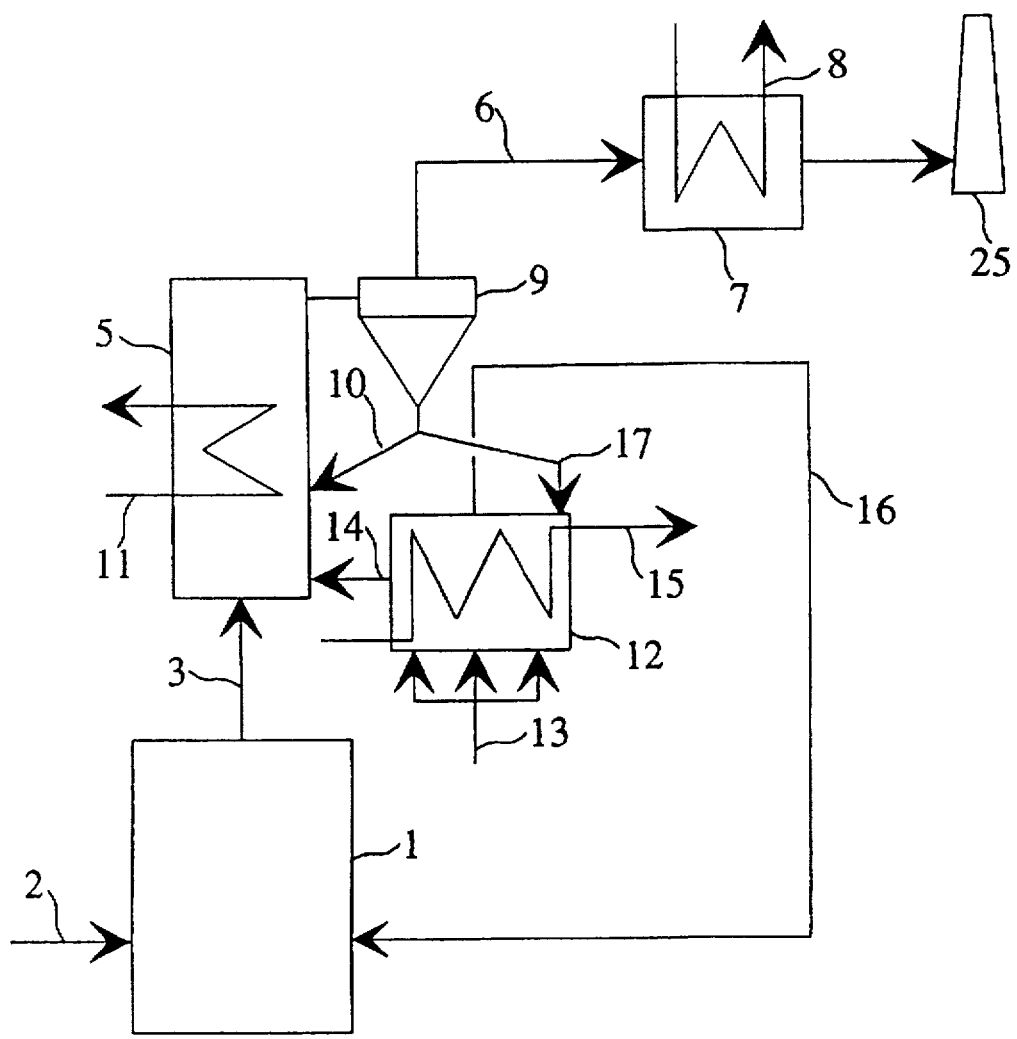
FIG. 2 shows a flow diagram of a second process variant.
Figure 3:
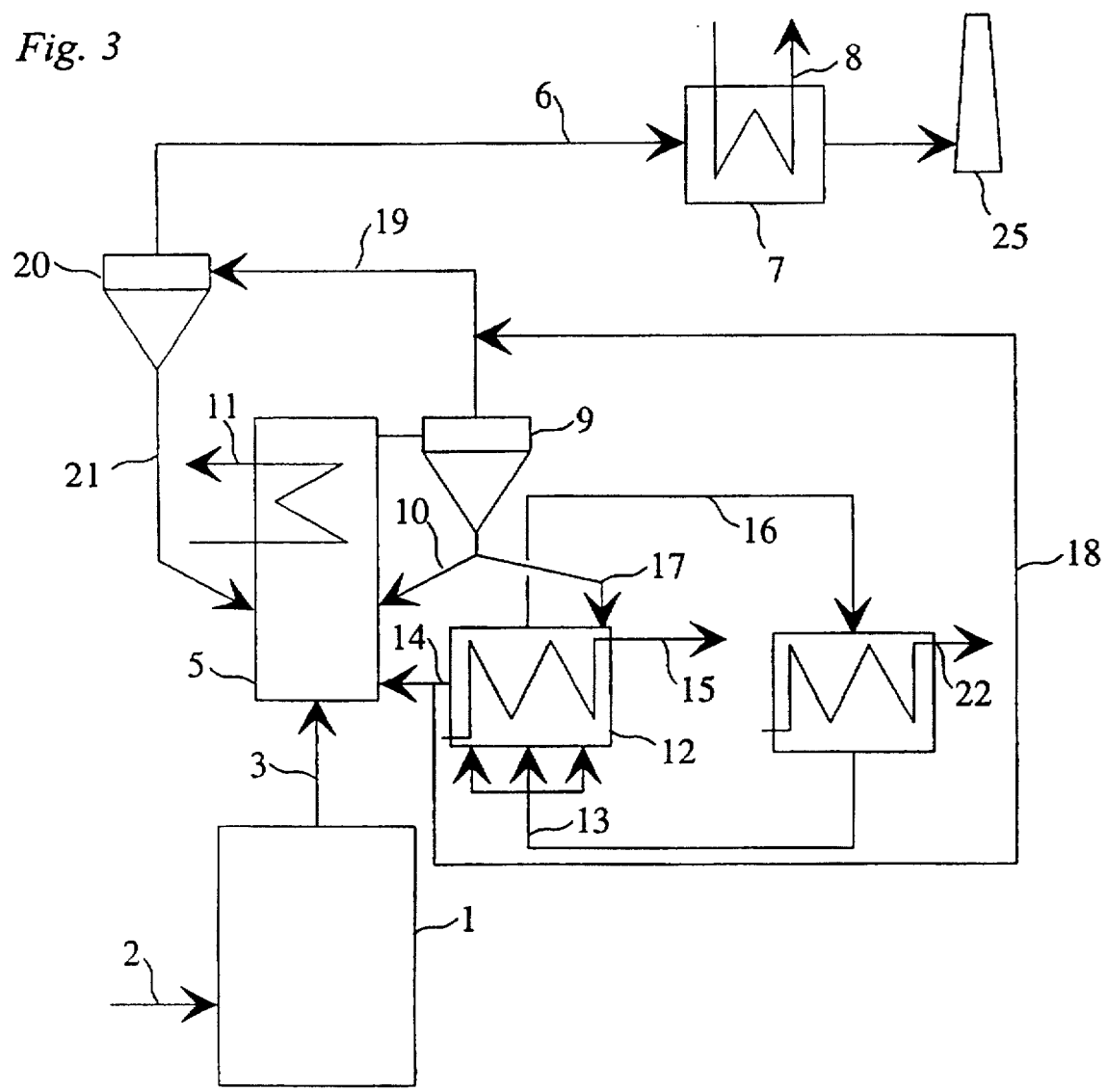
FIG. 3 show a flow diagram of a third process variant.

In FIGS. 1 to 3, 1 denotes a furnace chamber of a waste combustion plant which is known per se and in which the waste material is subjected to (I) the combustion process in a combustion step in a known manner, for example on a grate, with feed of combustion air, also termed primary air. The primary air feed is denoted by 2. Preferably, the furnace in this case is operated with oxygen-enriched air and with a specific oxygen ratio between 1.0 and 3.0 (based on the minimum amount of oxygen required for complete combustion). The gases formed in the combustion pass from the furnace chamber to an afterburning step in (II) an afterburning chamber 5 arranged above the furnace chamber, which afterburning chamber is designed according to the invention as a fluidized-bed reactor and is operated without additional oxygen supply. The gas transfer from the furnace chamber 1 to the afterburning chamber 5 is indicated by an arrow 3.

In the afterburning chamber 5, the combustion gases, which contain unburnt substances in streams and also oxygen, i.e. are not homogeneous, are brought into contact with fluidized solid particles. As solids, use can be made, inter alia, of lime, and sand. However, a preferred design is that the bed material of the fluidized bed is formed at least to a large part by the flyash exiting from the furnace. This assists in avoiding additional residues and thus minimizing consequential costs of the process such as landfill costs.

The good heat transfer from the gas-solids flow to the walls of the afterburning chamber 5 permits an efficient removal of heat from the fluidized bed, in that the walls are designed as cooling surfaces. If appropriate, further additional cooling surfaces 11 are installed in the fluidized bed. The amount of heat removed can thus be chosen so that a temperature optimum for the afterburning (preferably between 700° C. and 1100° C.) is produced in the fluidized bed.

The fluidized-bed reactor is operated at a sufficiently high gas velocity (superficial velocity of 2 m/s to 10 m/s) that at least some of the solid particles are discharged from the fluidized bed together with the flue gas stream. In a dust separator 9, e.g. a cyclone, a dust filter or an electrostatic precipitator, the flue gases exiting from the afterburning chamber 5 are freed from the entrained solids. The solids are recycled via a line 10 to the afterburning chamber 5, so that a circulating fluidized bed is formed. The fluidized bed is characterized by a very good cross-mixing of the gas streams coming from the furnace 1. By this means, a complete burn-up of the flue gases can be achieved without additional oxygen supply.

From the dust separator 9, the flue gases freed from solids are conducted, for heat recovery, via a line 6 to a conventional waste-heat boiler 7, equipped with cooling surfaces 8, before they pass to the stack 25 via flue gas cleaning devices which are not shown. In this waste-heat boiler 7, the flue gases are advantageously cooled to a temperature between 100° C. and 300° C.

The boiler efficiency can be further improved by using oxygen-enriched gases or pure oxygen for the firing, since in this manner the resulting flue gas volume can be considerably reduced.

According to FIG. 2, in which the parts of the flow diagram known from FIG. 1 and remaining identical are designated by the same reference numbers, the plant is extended by an external fluidized-bed cooler 12. This permits some of the heat removal to be moved out of the afterburning chamber 5. Some of the solids separated off in the dust separator 9 (or else all of the solids arising in the dust separator 9) are diverted via branch lines 17 into the fluidized-bed cooler 12, where they are cooled in a stationary fluidized bed by direct or indirect heat transfer (corresponding heat-transfer surfaces of the fluidized-bed cooler 12 are symbolized by 15) and then pass via a line 14 back into the afterburning chamber 5. In the afterburning chamber 5, these solids absorb the heat from the hot combustion gases and heat up to the mixing temperature prevailing in the afterburning chamber 5.

A fluidizing gas required for operating the fluidized-bed cooler 12 is fed to the fluidized-bed cooler 12 via lines 13. In the embodiment shown in FIG. 2, according to the invention, oxygen-containing gases are used for the fluidization in the fluidized-bed cooler, which oxygen-containing gases are taken off again above the fluidized bed and are introduced into the furnace chamber 1 via a line 16 as part of the primary air.

This variant permits particularly efficient heat removal from the afterburning chamber 5. Furthermore, arranging the heat-transfer surfaces 15, which are most greatly affected by corrosion phenomena, in the fluidized-bed cooler 12 permits a great reduction in boiler corrosion. In the fluidized-bed cooler 12, the heat-transfer surfaces 15 are less exposed to corrosion, since here the highly corrosively acting flue gases are not used at all.

In the variant shown in FIG. 3, some of the solids cooled in the fluidized-bed cooler 12 are added, for further cooling, to the flue gases leaving the dust separator 9 via a line 18. For this purpose, the solids are suspended in the flue gas stream, where they absorb the heat from the flue gas stream. This can occur in a pneumatic conveying section 19 or in a suspension-type heat exchanger stage 20. Preferably, a multistage cyclone heat exchanger can be used for this task. From the suspension-type heat exchanger stage 20, the solids are recycled to the afterburning chamber 5 via a line 21. By means of this further development, according to the invention the downstream, conventional waste-heat boiler 7 can be further reduced in size, or it can even be dispensed with entirely.

In this variant, the fluidizing gas, preferably air, required for operating the fluidized-bed cooler 12 is again taken off above the fluidized bed and then cooled in a heat exchanger 22 with simultaneous heat recovery. Cooled and, if necessary, dedusted, the gas is then directly reused as fluidizing gas in the fluidized-bed cooler 12 via the lines 13.

In the process variants shown in FIGS. 2 and 3, the temperature in the afterburning chamber 5 can be precisely controlled independently of the operating state of the furnace by controlling the input of the solids cooled in the fluidized-bed cooler 12. This enables ammonia, as reducing agent for nitrogen oxide removal, to be optimally introduced into the afterburning chamber 5 or into the dust separator 9 or cyclone, and the temperature to be selected so that the nitrogen oxide removal can be carried out with minimum ammonia consumption. Preferably, the ammonia is introduced into the cyclone intake.

We claim:

1. A process for the combustion of waste material with production of thermal energy, the waste material being burnt in (I) a combustion step with a primary air feed containing an amount of oxygen at least necessary for complete combustion with the production of flue gases containing oxygen and unburnt substances and the gases from the combustion then being fed to (II) an afterburning step, wherein the afterburning of the oxygen-containing gases from the combustion (I) proceeds in a circulating fluidized bed of solids solely with the oxygen present in the flue gases from the combustion process to achieve complete burnup of the flue gases and to produce a flue gas stream containing solids discharged from the fluidized bed, which solids are, separated off from the flue gas stream and at least some of the solids discharged from the afterburning step are directed to and cooled in an external fluidized-bed cooler with heat recovery and at least a portion thereof are passed back to the afterburning step wherein the temperature in the afterburning step (II) is 700° C. to 1100° C. and is controlled independently of the operating state of the combustion step (I) by controlling the solids mass flow rates diverted into the fluidized-bed cooler and passed back to the afterburning step (II) and by this means, also, by controlling the rate of heat removed from the afterburning step, the remaining solids discharged from the afterburning step and separated off from the fluid gas stream being recycled to the afterburning step (II).

2. The process according to claim 1, wherein the gas velocity (superficial velocity) of the oxygen-containing fluid gases is 2 m/s to 10 m/s in the afterburning step (II).

3. The process according to claim 1, wherein oxygen-containing gases are used for fluidization in the fluidized-bed cooler, which oxygen-containing gases are taken off above the fluidized bed and are conducted to the combustion step (I) as some of the primary air.

4. The process according to claim 1, wherein fluidizing gases used in the fluidized-bed cooler are taken off above the fluidized bed and, cooled with heat recovery, are reused directly as fluidizing gases in the fluidized-bed cooler.

5. The process according to claim 1, wherein some of the solids cooled in the fluidized-bed cooler are added to the flue gas stream freed from solids downstream of the afterburning step (II), cool this fluid gas stream, and, after being separated off in at least one suspension-type heat exchanger stage, are then recirculated to the afterburning step (II).

6. The process according to claim 1, wherein the solids of the fluidized bed in the afterburning step are at least in part formed by flyash originating from the combustion step (I).

7. The process according to claim 1, wherein a reducing agent is introduced into the afterburning step (II) for nitrogen oxide removal.

8. Process according to claim 7, wherein the reducing agent is ammonia.

9. The process according to claim 1, wherein a reducing agent is introduced, for nitrogen oxide removal, in the removal of the solids downstream of the afterburning step (II).

10. Process according to claim 9, wherein the reducing agent is ammonia.

11. The process according to claim 1, wherein the flue gases, downstream of the removal of the solids, are cooled, with heat recovery, in a conventional waste-heat boiler to a temperature between 100° C. and 300° C.

12. The process according to claim 1, wherein the combustion step (I) is operated with an oxygen ratio of 1.0 to 3.0, based on the theoretical minimum requirement for complete combustion.

13. The process according to claim 1, characterized in that the combustion step (I) is operated with oxygen-enriched air.

14. Apparatus for the combustion of waste material, having a furnace chamber and an afterburning chamber connected to the furnace chamber wherein the afterburning chamber is designed as a fluidized-bed reactor, downstream of which is connected a dust separator, a reconnection of the dust separator to the afterburning chamber being present to recirculate solids separated off in the dust separator and further, in order to cool and recirculate a portion of the solids separated off in the dust separator, a branching reconnection is present which leads to the afterburning chamber via an external fluidized-bed cooler, the apparatus being so designed that all the oxygen for combustion of the waste material is supplied to the furnace chamber by air or oxygen supplying lines.

15. Apparatus according to claim 14, wherein the walls of the fluidized-bed reactor are designed as heat-transfer surfaces.

16. Apparatus according to claim 14, having a gas line connection between the dust separator and a conventional waste-heat boiler for cooling the flue gases leaving the dust separator.

17. Apparatus according to claim 14, having at least one suspension-type heat exchanger step connected in a flue gas conveying section downstream of the dust separator, a line for feeding some of the solids cooled in the fluidized-bed cooler opening into the flue gas conveying section connecting the dust separator to the suspension-type heat exchanger stage, a reconnection of the suspension-type heat exchanger stage with the afterburning chamber being present to recirculate the solids separated off in the suspension-type heat exchanger stage.

18. Apparatus according to claim 15, having a gas line connecting the fluidized-bed cooler to the furnace chamber for feeding oxygen-containing gases leaving the fluidized-bed cooler into the furnace chamber as part of the primary combustion air.

19. Apparatus according to claim 14, characterized by an additional heat exchanger which is connected via gas lines to the fluidized-bed cooler for cooling and recirculating fluidizing gases leaving the fluidized-bed cooler.

* * * * *